United States Patent
Bianco, Sr.

[11] Patent Number: 5,490,403
[45] Date of Patent: Feb. 13, 1996

[54] HAND BRAKE LEVER LOCK

[76] Inventor: Thomas A. Bianco, Sr., 36 Lupine St., Wallingford, Conn. 06492

[21] Appl. No.: 240,242

[22] Filed: May 10, 1994

[51] Int. Cl.⁶ .................................................. E05B 13/00
[52] U.S. Cl. .................. 70/202; 70/247; 70/168; 70/211; 70/258; 70/DIG. 58
[58] Field of Search ............................. 70/247, 163, 164, 70/167–169, 202, 203, 211, 212, 232, 246, DIG. 58, 258; 292/DIG. 2

[56] References Cited

U.S. PATENT DOCUMENTS

| | | | |
|---|---|---|---|
| 1,741,990 | 12/1929 | Johnson | 70/245 |
| 1,947,081 | 2/1934 | Grady et al. | 292/DIG. 2 |
| 3,084,965 | 4/1963 | Carosello | 292/DIG. 2 |
| 3,210,972 | 10/1965 | Johnson | 70/211 |
| 3,469,041 | 9/1969 | Winston | 70/DIG. 58 |
| 3,636,742 | 1/1972 | Raney | 70/DIG. 58 |
| 3,710,606 | 1/1973 | Prince | 70/DIG. 58 |
| 4,282,769 | 8/1981 | Sandrock | 70/247 |
| 4,791,795 | 12/1988 | Burgess et al. | 70/211 |
| 4,825,671 | 5/1989 | Wu | 70/238 |
| 4,858,451 | 8/1989 | Balina et al. | 70/202 |
| 4,899,564 | 2/1990 | Gilbert | 292/DIG. 2 |
| 4,938,042 | 7/1990 | Muramatsu | 70/247 |
| 4,995,250 | 2/1991 | Chiou | 70/238 |
| 5,020,390 | 6/1991 | Chang | 70/247 |
| 5,038,667 | 8/1991 | Slater | 70/238 |
| 5,134,764 | 8/1992 | Taylor | 70/237 |
| 5,201,202 | 4/1993 | Kam | 70/168 |
| 5,311,756 | 5/1994 | Villani | 70/202 |

FOREIGN PATENT DOCUMENTS

| | | | |
|---|---|---|---|
| 454672 | 10/1936 | United Kingdom | 70/DIG. 58 |
| 2024128 | 1/1980 | United Kingdom | 70/202 |

Primary Examiner—Darnell M. Boucher
Attorney, Agent, or Firm—Norman B. Rainer

[57] ABSTRACT

A locking device adapted to be mounted upon a hand brake lever handle of an automobile in a manner to prevent theft of the automobile includes a tubular inner sleeve adapted to attach to the handle, and a tubular outer sleeve which removably and telescopically engages the inner sleeve. A lock located at the upper extremity of the outer secures the outer sleeve to the inner sleeve, thereby preventing access to an underlying depressable brake release button on the lever handle.

2 Claims, 2 Drawing Sheets

HAND BRAKE LEVER LOCK

BACKGROUND OF THE INVENTION

1. Field of the Invention

This invention relates to automobile anti-theft devices, and more particularly concerns a locking device adapted to be mounted upon a hand brake lever handle of an automobile in a manner to prevent unauthorized use of the automobile.

2. Description of the Prior Art

A motor vehicle hand brake operating lever is generally designed to be manually moved between forward and rearward positions, thereby controlling an associated ratchet mechanism adapted to activate or release the vehicle's brakes. In the brake-activated position, the lever remains locked in position by virtue of the ratchet mechanism. A manually operable release member, such as a push-button, serves to lift a pawl from the ratchet mechanism, thereby permitting movement of the lever to the brake-released position. A motor vehicle having such a hand-brake is herein referred to as being "of the kind referred to", and such hand-brakes are sometimes referred to as "parking" or "emergency" brakes.

Numerous vehicular anti-theft devices have been disclosed in the prior art. Various locks have been employed in attempts to prevent theft of a motor vehicle, by preventing disengagement of a parking brake. For example, it has been proposed to replace the push-button ratchet release button on the extremity of a conventional hand-brake lever with a push-button having a cylinder lock incorporated therein. In such construction, the push-button can only be depressed when the lock is unlocked. However, such locking mechanisms have proved ineffective because the locking detent or the like employed by the lock can be fractured by a hammer blow applied to the push-button. One such locking device is disclosed in U.S. Pat. No. 5,134,784, wherein the lock is designed to resist fracturing. However, locks of this type have the inherent disadvantage that they must be factory installed within the hand brake lever. Therefore, retrofitting of an existing automobile with such a device would require replacement of the entire hand brake lever, and perhaps the associated ratchet assembly.

Locks have been proposed having a sleeve emplaced upon the lever of the hand-brake and having means for depressing the pushbutton of the hand-brake. In the locked condition of the lock, the depressing means cannot be moved. Such locking devices have been further provided with rotatable number dials wherein a predetermined combination of numbers opens the lock. A lock of this type is disclosed in U.S. Pat. No. 1,088,853.

The effectiveness of combination locks can be thwarted by individuals with sensitive feeling in the fingertips or sufficient aptitude and patience. In the case of multi-dial combination locks, the owner may inadvertently leave the lock with the opening combination showing, thereby enabling others to know said combination. The known locks are further burdened by the disadvantage that they do not comply with international safety standards. In accordance with such standards, release of the stopping brake of a motor vehicle during operation should not be impeded. In the case of known combination-based locks, it is possible that a number dial can be accidentally rotated out of the position corresponding to the unlocked condition of the locking device. In a dangerous situation, for example, when the service brake of the vehicle has become defective or failed, it is possible that the hand brake must be repeatedly applied and released. If in the meantime, at least one of the number dials has been shifted out of the unlocked condition, the once applied brake cannot be immediately released, thereby increasing the risk of an accident. A further disadvantage of such locks is the visual and manipulative difficulty which may be encountered in unlocking the device, particularly by vision-impaired individuals or in a substantially dark vehicle. In an emergency situation, such as a potential assault, robbery, or car-jacking, the critical time necessary to manipulate the lock to the unlocked position may seriously delay movement of the vehicle.

Other locking devices have been disclosed which seek to render a vehicle incapable of operation through the simultaneous locking of the hand-brake lever to either the gear shift lever or steering wheel. For example, U.S. Pat. No. 5,038,667 discloses a device which secures the hand brake lever to the gear shift lever of an automobile. This device is made up of two interactive limbs. One limb comprises a sleeve which is slid onto the hand brake lever, thereby preventing depression of the release button and attendant movement of the handle. The other limb has locking clamp means fastened around the gear shift lever. This device has many parts, is complicated, requiring two hands for emplacement and removal, and is not amenable to low cost manufacture.

U.S. Pat. No. 4,995,250 discloses a gear-shift-to-brake-lever lock device having a moveable sleeve and a main rod mounted with five combination rings. This lock has the aforesaid disadvantages of a combination lock and requires two hands to extend into locked position. Furthermore, it is expensive to manufacture and its use may put deleterious strain on the gear shift lever.

U.S. Pat. No. 4,825,671 discloses an extensible locking device having one extremity adapted to be locked around a steering wheel, and another extremity having a tube engaging the hand brake lever, thereby preventing depression of the release button. This device is expensive to produce and difficult to deploy and remove, requiring manipulation of two key locks, and two hands to operate.

It is accordingly an object of the present invention to provide a locking device for a hand-brake lever of a motor vehicle wherein depression of a release button on said lever may be prevented.

It is another object of the present invention to provide a locking device as in the foregoing object which may be easily installed upon hand-brake levers of existing vehicles.

It is a further object of this invention to provide a locking device of the aforesaid nature which is simple to deploy and remove, durable in construction and amenable to low cost manufacture.

These and other beneficial objects and advantages will be apparent from the following description.

SUMMARY OF THE INVENTION

The above and other beneficial objects and advantages are accomplished in accordance with the present invention by a locking device adapted to be mounted upon an automobile hand-brake lever housing having an elongated tubular forward portion terminating in an upper extremity having a depressible button adapted to activate a brake-releasing pawl within said housing, said locking device comprising:

a) a tubular inner sleeve having an interior region bounded by a sidewall adapted to closely embrace said brake lever handle, said inner sleeve having a lower extremity having an abutment shoulder and an upper extremity having lock engagement means, b) a tubular outer sleeve having an interior region bounded in part by a sidewall adapted to closely embrace said inner sleeve, said outer sleeve having an open lower extremity adapted to contact said abutment shoulder, and a closed upper extremity having a fixedly associated end panel provided with a lock mounting aperture, and c) key-operated lock means fixedly associated with said lock mounting aperture and having a rotatable cam adapted to interlock with said lock engagement means.

In a preferred embodiment, the inner and outer sleeves are fabricated from tubular steel, stainless steel, or aluminum having square cross sections. Alternative embodiments may utilize round tubing or may be fabricated from a thermoplastic resin in an injection molding process. The lock engagement means may be in the form of an elongated flat member such as a panel or bar coextensive with the sidewall of said inner sleeve and having a slotted aperture.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
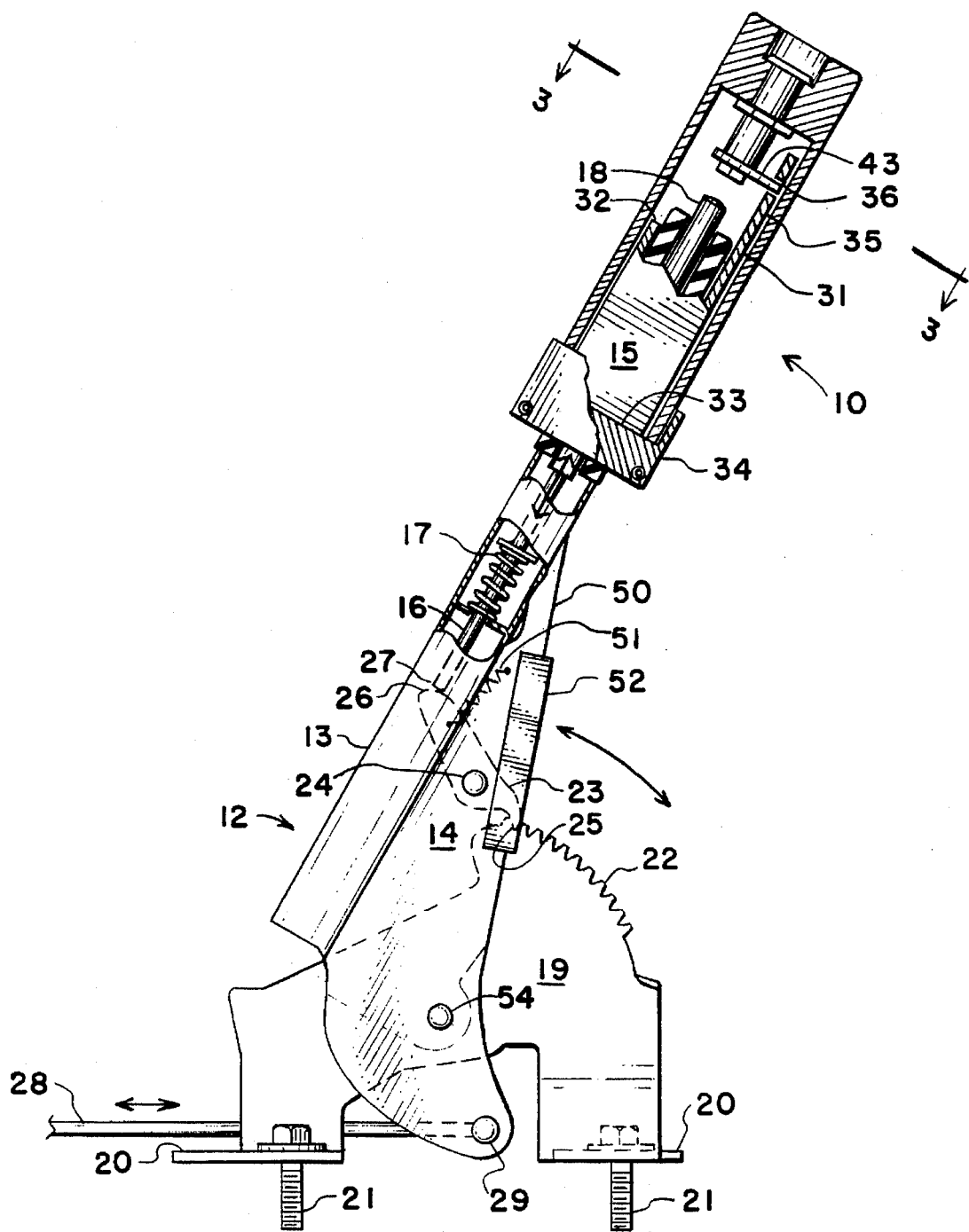
FIG. 1 is a side view of an embodiment of the locking device of the present invention, with portions broken away, shown in operative association with a hand brake operating lever.
Figure 2:
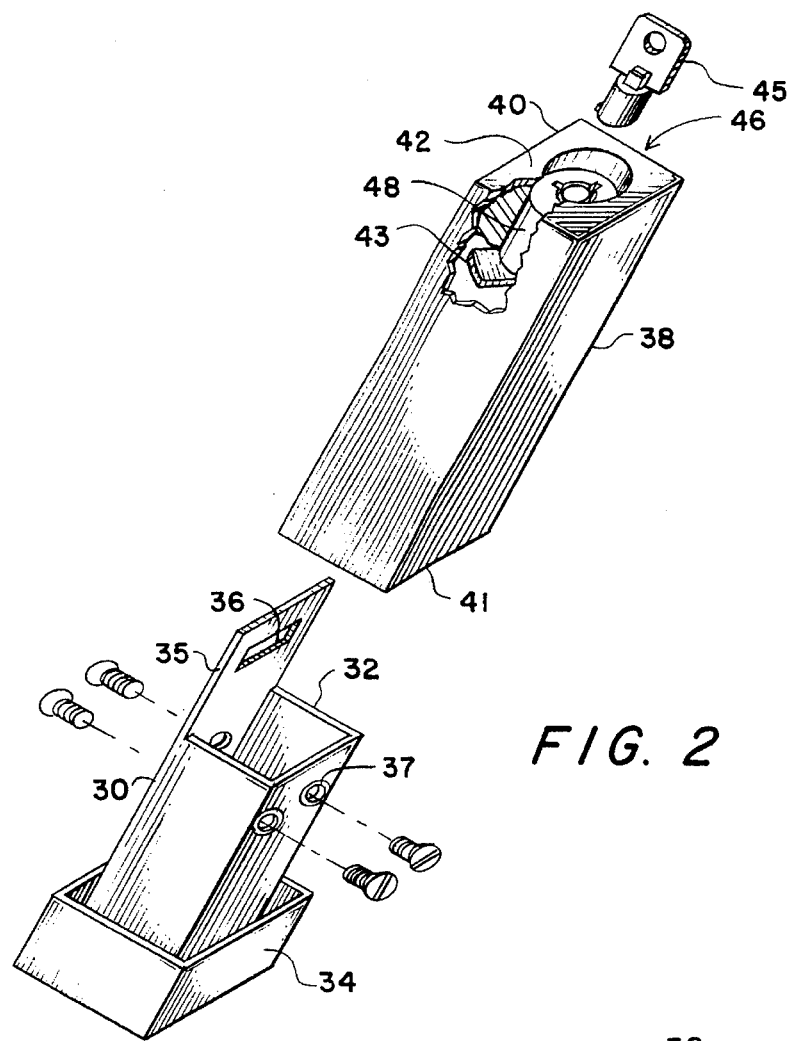
FIG. 2 is an exploded perspective view of the locking device of FIG. 1.
Figure 3:
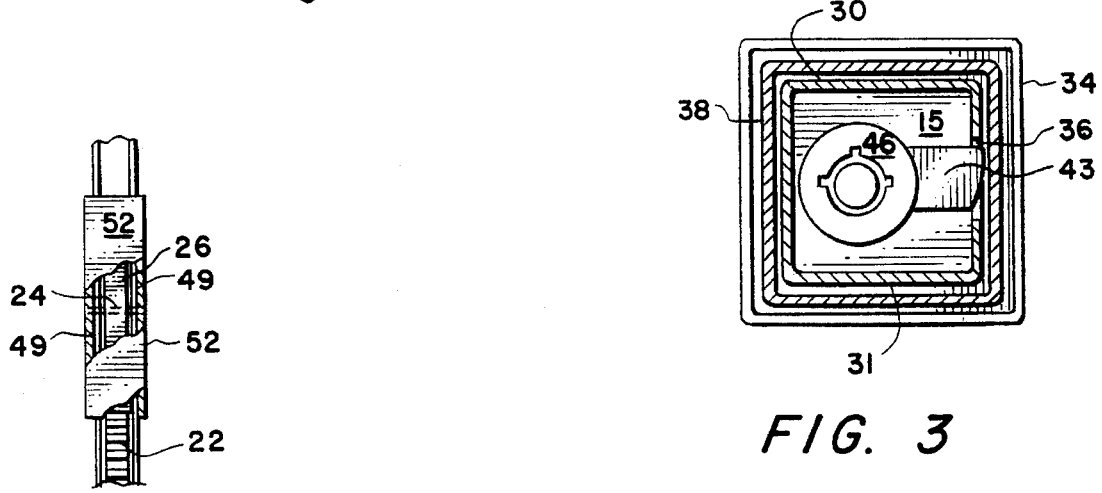
FIG. 3 is a sectional view taken in the direction of the arrows upon the line 3—3 of FIG. 1.
Figure 4:
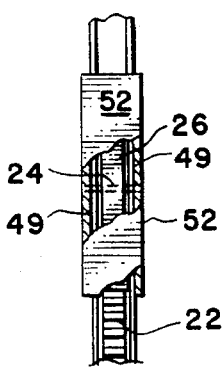
FIG. 4 is an enlarged fragmentary rear view of the device of FIG. 1.

Referring to FIGS. 1–4, an embodiment of the locking device 10 of the present invention is shown mounted upon a hand brake operating lever assembly 11 of conventional design.

Lever assembly 11 is comprised of housing 12 having a forwardly disposed tubular portion 13 and a substantially flat region 14. The housing is generally formed from a single piece of sheet metal which is bent about a centered plane of symmetry to produce said tubular portion and flat region 14 defined by facing parallel panel portions 49 of said piece of sheet metal. The rear extremity 50 of housing 12 is generally open and defined by the spaced apart edges of panel portions 49. The uppermost part of tubular portion 13 is enlarged to form a gripping handle 15. A control rod 16 is slidably held within tubular portion 13 and adapted to undergo reciprocal motion therein in an up and down direction. A restoring coil spring 17 interactive between said control rod and tubular portion urges said control rod upwardly. The uppermost extremity of said control rod may be enlarged to form a button 18 that protrudes upwardly beyond handle 15.

A gear plate 19 is embraced by flat region 14. First pivot means 54 achieves interactive engagement of said gear plate with said flat region. Gear plate 19 is preferably disposed in a vertical plane and has footing brackets 20 that permit anchoring to the chassis of a vehicle by means or bolts 21. A set of uniformly spaced ratchet, teeth 22 is disposed in an arcuate locus upon the upper extremity of said gear plate.

Pawl 23, secured by second pivot means 24 to flat region 14, has a rearwardly and downwardly directed pointed extremity 25 adapted to interact with the teeth 22 of said gear plate. The forward extremity 26 of pawl 23 is configured and positioned to be contacted by the lower extremity 27 of control rod 16. A biasing coil spring 51 urges said pointed extremity into contact with teeth 22.

A brake rod 28, substantially horizontally disposed, is attached at its rearward extremity to the lowermost extremity of flat region 14, said attachment being achieved by third pivot means 29. The unshown forward extremity of brake rod 28 is mechanically coupled to the vehicle's brakes.

In the normal operation of the lever assembly, the vehicle's brakes are applied when gripping handle 15 is forced rearwardly as far as it will go. Such action pulls brake rod 28 forwardly with consequent application of force to the vehicle's brakes. In such braked position, the point 25 of pawl 23 engages teeth 22, thereby preventing movement of the lever assembly. When it is desired to release the brakes, button 18 is depressed, causing consequent lifting of point 25, and enabling handle 15 to be pushed forwardly. Such forward motion of the handle pushes brake rod 28 rearward, thereby releasing the vehicle's brakes.

Locking device 10 is comprised of tubular inner sleeve 30 of rectangular configuration bounded by flat sidewalls 31 dimensioned to closely fit about handle 15. Said inner sleeve is elongated between upper and lower extremities 32 and 33, respectively. An abutment shoulder 34, outwardly directed from the sleeve, is associated with lower extremity 33. Although the exemplified embodiment of abutment shoulder surrounds said inner sleeve, non-surrounding embodiments are also contemplated. Lock engagement means in the form of extension tab 35 extends upwardly from upper extremity 32 as a continuous integral extension of one of said sidewalls 31. A slot 36 is positioned in tab 35 in a direction transverse to the direction of elongation of said inner sleeve. Mounting holes 37 are located in at least one sidewall 31 to permit bolting of said inner sleeve to handle Tubular outer sleeve 38, of rectangular configuration, bounded by flat sidewall panels 39 and elongated between upper and lower extremities 40 and 41, respectively, is dimensioned to slideably embrace said inner sleeve 30 in close fit therewith. Said lower extremity 41 is open, and said upper extremity 40 is sealed by end panel 42. Key-activated lock means 46 having a rotatable tumbler 48 of conventional design and radially directed cam 43 is secured by end panel 42. Alternative lock mechanisms may be employed, including self-locking spring bolt devices. The length of outer sleeve 38 is such that, when emplaced upon inner sleeve 30, lower extremity 41 will contact abutment shoulder 34, and cam 43 is positioned to enter slot 36.

The dimensions of the locking device and its manner of installation upon handle 15 of the brake lever assembly are such that cam 43 is above button 18. In the operation of the locking device, outer sleeve 38 is slid onto inner sleeve 30 when the brake lever assembly is in its forward, brake-activated position, and said outer sleeve is caused to engage inner sleeve 30 by virtue of the use of key 45 that rotates cam 43 into engagement with slot 36. In such manner of use, button 18 cannot be depressed to cause release of the vehicle's brakes. Upon removal of outer sleeve 38, using key 45, button 18 becomes accessible for release of the brakes.

In a further aspect of the present invention, occlusive means in the form of plate 52 is attached as by welding, glueing or bolting in bridging relationship across the spaced apart panel. portions 49 defining the rear extremity 50 of housing 12. Said occlusive means prevents access to and possible manipulative tampering with pawl 23 in a manner to thwart the anti-theft purpose of the present invention. The occlusive means along with instructions and attachment means therefor would be packaged with the device as a kit for marketing purposes.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A locking device adapted to be mounted upon an automobile hand-brake lever housing having an elongated tubular forward portion terminating in an upper, handle extremity having a depressible button adapted to activate a brake-releasing pawl within said housing, said locking device comprising:

a) a tubular inner sleeve having an interior region bounded by a sidewall of square cross-sectional configuration adapted to closely embrace said handle extremity, said inner sleeve having a lower extremity having a surrounding abutment shoulder, an upper extremity having lock engagement means in the form of a slotted aperture positioned within a tab that extends upwardly from the upper extremity of said inner sleeve as a continuous integral extension of the sidewall of said inner sleeve, b) a tubular outer sleeve having an interior region bounded in part by a sidewall of square cross-sectional configuration adapted to closely embrace said inner sleeve, said outer sleeve having an open lower extremity adapted to contact said abutment shoulder, and a closed upper extremity having a fixedly associated end panel provided with a lock mounting aperture, the length of said outer sleeve, measured between said upper and lower extremities being such that, when slideably emplaced upon said inner sleeve, the lower extremity of said outer sleeve contacts said abutment shoulder, and c) key-operated lock means fixedly associated with said lock mounting aperture and having a rotatable cam adapted to interlock with said lock engagement means.

2. The device of claim 1 further comprised of occlusive means configured to attach to said housing in a manner to prevent access to said pawl.

* * * * *